PORTABLE RADIO RECEIVER CABINET

Filed July 12, 1965 Sheet 1 of 2

INVENTOR

Peter Brady

BY Polachek & Saulsbury

ATTORNEYS.

PORTABLE RADIO RECEIVER CABINET

Filed July 12, 1965

INVENTOR

Peter Brady

BY

Polachek & Saulsbury

ATTORNEYS.

United States Patent Office 3,426,282

Patented Feb. 4, 1969

3,426,282

PORTABLE RADIO RECEIVER CABINET

Peter Brady, Bronx, N.Y.
(90—10 34th Ave., Jackson Heights, N.Y. 11372)

Filed July 12, 1965, Ser. No. 471,325
U.S. Cl. 325—353 11 Claims
Int. Cl. H04b *1/08;* H04m *1/00*

ABSTRACT OF THE DISCLOSURE

A portable radio receiver cabinet having an easily removable earphone listening device consisting of an ear plug and conductor cord. The plug and cord are stored in a dust free slim removable compartment in the cabinet. The compartment has an openable cover and the cord is wound on a take up reel in the compartment. Upon opening the cover, the ear plug and cord are adapted to be pulled out in a straight line fashion. Afterwards the ear plug is adapted to be retracted into the compartment by the take up reel.

This invention relates to a new and improved ear plug and like holding device which can be directly and removably secured to a portable, preferably transistorized radio receiver.

Commercial transistorized radio receivers of the portable type usually leave provisions for an earphone listening device, which usually consists of an ear plug and a cord attached thereto. This unit is contained in a small leather or plastic carrying case. The disadvantage of this arrangement is that the carrying case may be easily misplaced or lost thus causing considerable inconvenience to the listener of the radio receiver. Furthermore, the cord after being removed from the carrying case, is usually kinky and in knots, thus requiring considerable amount of time for straightening out. In addition, the ear plug is not adequately protected from dust and other unsanitary conditions. Also, since all better portable radio receivers are adapted to draw their power either from battery operation or from external alternating power source, there are no provisions for eliminating knots and kinky configurations from the power cord.

The present invention eliminates all these previously stated disadvantages, in that the cord is located in a very slim compartment in which the cord is wound on a take-up reel. Upon opening of the cover of the compartment the ear plug and the cord are pulled out from the compartment in a straight line fashion. Afterwards, the ear plug is retracted to the compartment by take-up reel. The cover on the compartment insures that the ear plug can be always kept in a dust-free and sanitary condition. The compartment is removably secured to a portable radio receiver by a clamp. The other arrangements, which are within the scope of the invention, show that the compartments can be secured to the receiver by magnetic means.

Therefore, the main object of this invention is to provide a new and improved holding device wherein an easily removable ear plug and cord can be stored in a dust-free compartment adapted to be directly and removably secured to a radio receiver set.

Another object of this invention is to provide a new and improved holding device, from which the ear plug and the cord can be pulled out in a straight line fashion, thus eliminating knots and kinky configurations on the cord.

Another object of this invention is that the compartment can be magnetically received to the radio receiver cabinet.

Another object of this invention is to provide a new and improved holding clip including a compartment for ear plug means and a compartment for cord plug to be connected with an external power source.

Another object of this invention is to provide a new and improved holding clip which can be secured to the radio receiver set by means of a clamp.

Another object of this invention is to provide a new and improved holding clip which can be secured to the radio receiver set by magnetic means.

Another object of this invention is to provide holding means which are adapted to be used with portable transistor radio receivers, without having to modify them in any manner.

Other and further important objects of this invention will become apparent from the disclosures in the following specification and the accompanying drawings, in which.

Figure 1:
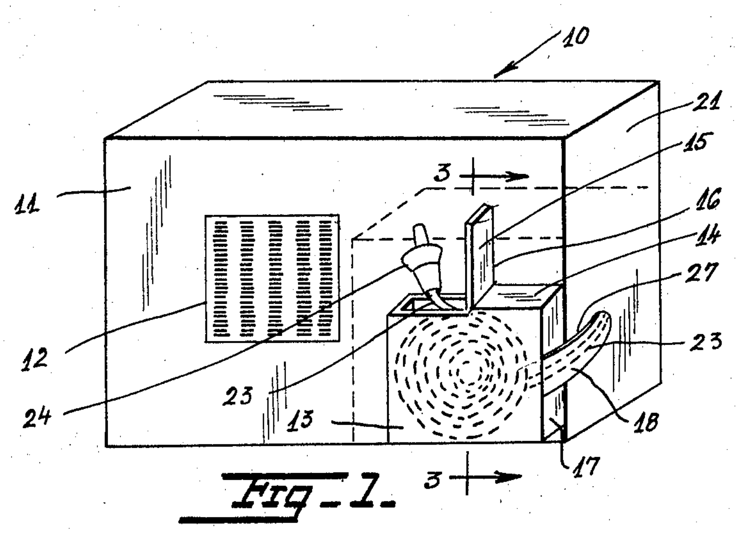
FIG. 1 is a perspective view, illustrating the rear side of a portable radio receiver set, with an attached compartment removably connected to the receiver set by means of a clamp.

As shown in the drawings there is shown a portable radio receiver cabinet 10 made of plastic substance. On the rear wall 11 of the cabinet 10 there is baffle 12 for a loudspeaker (not shown). At the lower rear wall corner a compartment 13 is provided. The top portion 14 of the compartment includes a cover 15. Cover 15 is connected with the top portion 14 by means of hinges 16. Compartment 13 made out of plastic material at its front end 17 is fixedly located with an elongated clamp 18, which is made of spring steel. The other end of clamp 18 is sealingly connected with a plug 19, which is located on the inside portion of the clamp. Plug 19 is adapted to matingly engage with a socket 20 located on the side wall 21 of the cabinet 10.

Figure 4:
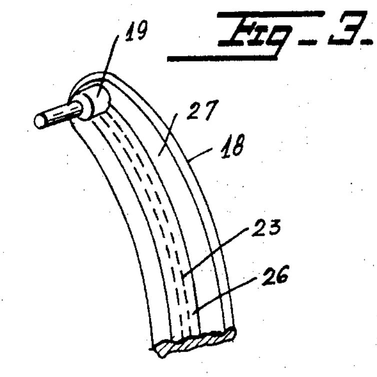
FIG. 4 shows a fragmentary view of the clamp wherein the electric cord is connected to the clamp in a sealing relationship.
Figure 5:
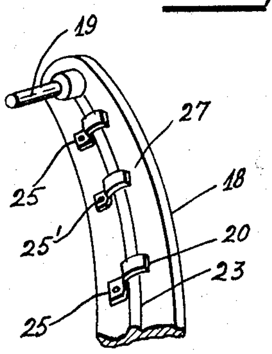
FIG. 5 shows a fragmentary view of a clamp wherein the electric cord is connected to the clamp by means of brackets.

Within compartment 13 there is a take-up reel 32 which is spring biased in any suitable well-known manner. Compartment 13 is provided with electric cord 23 which is coiled or wound on take-up reel 22 mounted on axis 24' of the compartment. Reel 22 tends to keep the electric cord 23 coiled on the reel but permits the cord to be uncoiled or unwound to any desired length. One end of the electric cord 23 is connected with an earphone plug 24; this plug can be pulled out from compartment 13 in a straight line fashion and inserted into the ear of the listener. When plug 24 is not in use, cover 15 is in its closed position. This arrangement permits plug 24 to be held in a dirt-free and sanitary condition. The other end of electric cord 23 is located within clamp 18 and is connected to plug 19. In the present invention, according to FIG. 4, electric cord 23 can be positioned within the internal portion 27 of clamp 18 and sealingly secured thereto. The sealing substance used for securing the electric cord to the internal portion 27 of clamp 18 can be rubberized tape, plastic or the like.

In another version of this invention the provisions are made to centrally position and secure the cord 23 inside portion 27 of the clamp 18 by means of miniature brackets 25, which are spacingly secured to the inside portion of the clamp by set screws 25'. Socket 20 is directly connected to amplifier portion of the portable radio receiver cabinet 10.

The construction of the amplifier is not shown and it can be of solid state or tube type.

Since this invention is not concerned with the circuits and other components, such as, knobs, antenna and/or handle of the radio receiving set, they have not been illustrated. It is understood that any construction may be employed which is suitable for the purpose and method of operation pertaining to a portable radio receiver set, preferably a transistor radio.

Figures 6, 7:
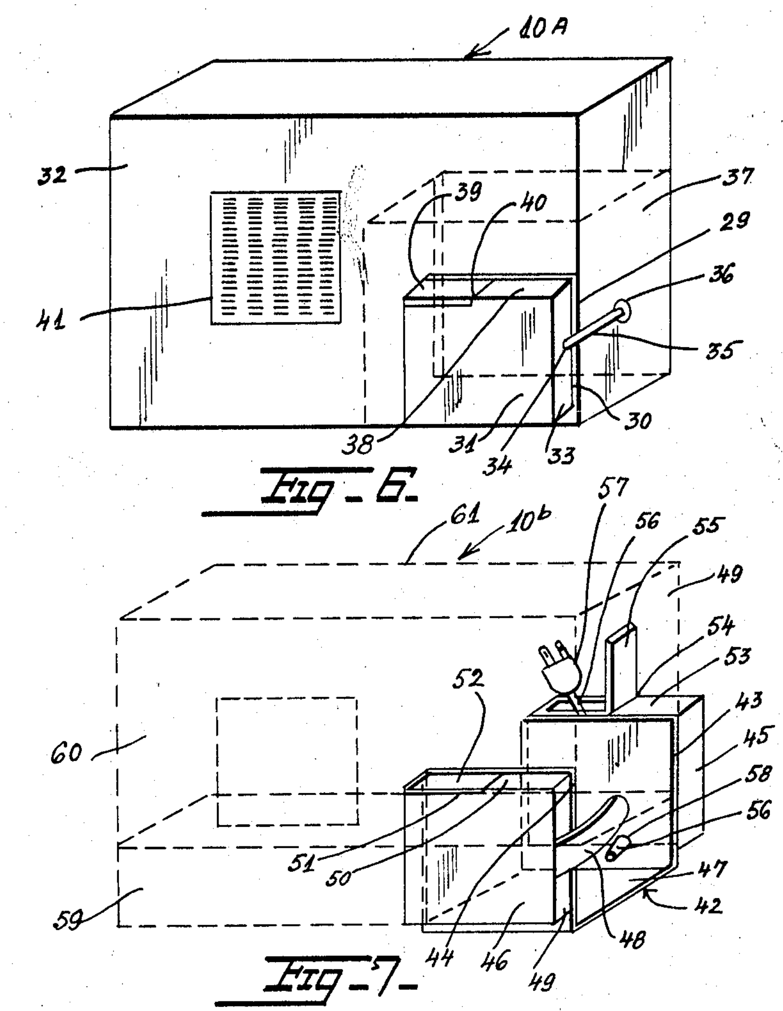
FIG. 6 is a perspective view, illustrating the rear side of a portable radio receiver set, wherein the compartment is attached to the radio receiver through a magnetized strip of metal.
FIG. 7 is a perspective view, illustrating a clip adapted to be attached to a radio receiver set having compartments on each side of the clip.

Referring to FIG. 6, one side of magnetized metallic strip 29 is fixedly attached in any suitable manner to the side 30 of compartment 31 thus forming a magnetized compartment, which otherwise is of substantially identical construction as the compartment 13 shown in FIG. 1. This magnetized compartment 31 can be used with a portable radio receiver cabinet 10A made of metallic substance. In this manner, the use of clamp (as shown in FIGS. 1, 2, 4 and 5) is eliminated, since the magnetized compartment 31 is fixedly and removably attached to the rear wall 32 of the metallic cabinet 10A. The front end 31 of the compartment 33 features an opening 34 through which a portion of the electric cord 35 extends into plug 36. Plug 36 is inserted into socket (not shown) located within the side wall 37 of cabinet 10A, which socket, in turn, is connected with amplifier. It should be noted that like in the arrangement shown in FIG. 1, the top portion 38 of the compartment 31 includes cover 39 connected with hinges 40. Also, on the rear wall 32 of the cabinet 10A there is baffle 41.

Figure 3:
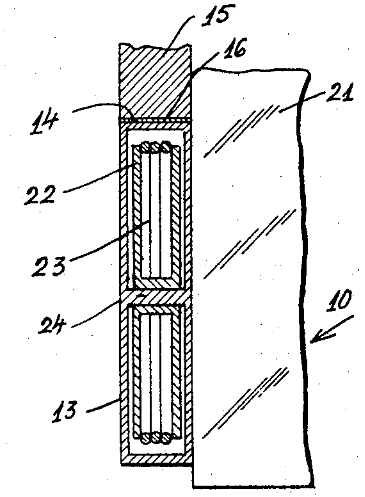
FIG. 3 is an enlarged fragmental view of a vertical section taken from line 3—3 of FIG. 1, showing components located within the compartment.
Figure 2:
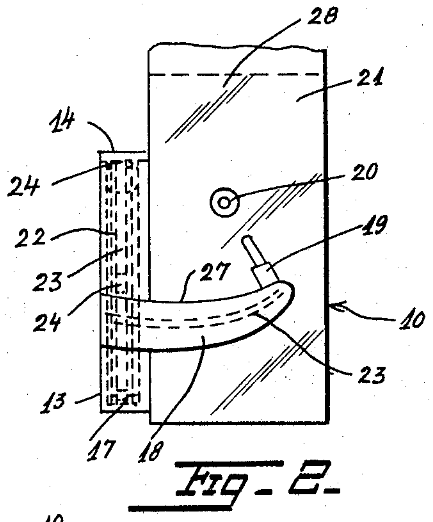
FIG. 2 is a partial fragmentary side view of the portable radio receiver set, wherein the clamp of the compartment is disconnected from the socket.

As shown in the embodiment of FIGURE 7, a clip 42 is provided featuring U-type configuration. The side portions 43, 44 and bottom portion 47 of clip 42 are of the same length as compartments 45, 46. On each of external side portions 43, 44 of clip 42, compartments 45, 46 are mounted in any suitable manner. The inside construction of each of both compartments is substantially identical with the inside construction (take-up real, etc.) of compartment 13 shown in FIGURES 1, 2 and 3. Like in the previous description, a steel clamp 48 is fixedly attached to the front portion 49 of the compartment 46. The other side of spring steel clamp 48 is connected to a socket (not shown) which is located side portion 49 of the cabinet 10B. This arrangement so far is substantially similar to one described in connection with steel clamp 18, as shown in FIGS. 1, 2, 4 or 5. Furthermore, the top portion 50 of the compartment 46 features a hinged cover 52.

Compartment 45 is fixedly connected with the external side portion 43 in any suitable manner. The top portion 53 features hinged cover 55 which is in an open position. Compartment 45 includes a take-up reel (not shown) which is identically positioned and constructed as take-up reel 22 explained before. Electric cord 56 is coiled or wound on the take-up reel located within the compartment. Like the reel is previous explanation, the reel located within compartment tends to keep the electric cord 56 coiled on the reel but permits the cord to be uncoiled or unwound to any desired length. One end of electric cord 56 is fixedly connected with an electric plug 57 which is adapted to be connected with an external alternating current source, such as, a wall outlet. The other end of cord 56 passes through an opening (not shown) in the lower portion of the compartment 45 to an opening 58 located in the bottom portion of the external side 43 of the clip 42. This end of cord 56 is connected to the chassis 59 (shown in dotted lines in the bottom section of cabinet 10B). As it can be seen from the above description the arrangement shown in FIG. 7 is not dependent on the internal power source, but is also adapted to accommodate a compartment holding electrical cord designated to be used with an external power source. In view of this, the holding clip 42 now is adapted to operably utilize compartment 46 located at the rear wall 60 and compartment 45 located at the front wall 61.

Figure 8:
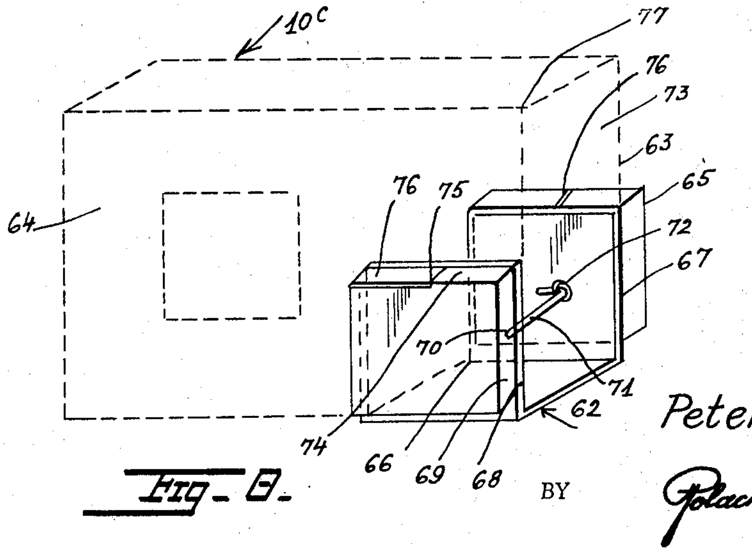
FIG. 8 is a perspective view of a magnetic clip which is similar to the one shown in FIG. 7.

FIGURE 8 features an arrangement which is similar to the previously explained arrangement as shown in FIG. 7, with the exception that holding clip 62 is made of magnetized, metallic substance and therefore can be removably secured to the front and rear walls 63, 64 of cabinet 10C which is made of metallic substance. Like in the previous explanation compartments 65, 66 are fixedly secured in any desired manner to the exterior walls 67, 68 of the magnetized clip 62. As in previously explained arrangement shown in FIG. 6 the use of spring steel clamp is eliminated, since the magnetized clip 62 can removably secure compartments 65, 66 to the cabinet 10C. Like in the arrangement of FIG. 6, the front end 69 of the compartment 66 features an opening 70 through which a portion of electric cord 71 extends into the plug 72. Plug 72 is inserted into the socket (not shown) located within the sidewall 73 of the cabinet 10C. It should be noted that like in the previous arrangements, the top portion 73 of the compartment 66 includes hinged cover 76. Also, the top portion of compartment 65 includes hinged cover 77.

It will be obvious to those skilled in the art that various modifications may be restored in a manner limited only by a just interpretation of the following claims.

What is claimed is:

1. A portable cabinet having side, front and rear walls, a radio receiver means fixedly enclosed within said walls, an earphone socket mounted in one of said side walls, an openable compartment, winding means within said compartment, a flexible conductor means wound around the axis of said winding means, an earphone fixedly attached to one end of said conductor means, an earphone plug attached to the other end of said flexible conductor means, clamp means fixedly connected with said compartment, one end of said clamp means fixedly connected with said compartment, the other end of said clamp means fixedly connected with said plug, which plug being adapted to matingly and removably engage said socket, and during the engagement of said plug to said socket said compartment being supported by said clamp means and removably secured thereto.

2. A portable cabinet having side, front and rear walls, a radio receiver means fixedly enclosed within said walls, an earphone socket mounted in one of said side walls, an openable compartment having a hinged cover located at the top portion of said compartment, winding means within said compartment, a flexible conductor means wound around the axis of said winding means, an earphone fixedly attached to one end of said conductor means, said earphone adapted for its removal from said compartment when said cover is raised to an open position, an earphone plug attached to the other end of said flexible conductor means, clamp means fixedly connected with said compartment, one end of said clamp means fixedly connected with said compartment, the other end of said clamp means being connected with said plug, which plug being adapted to matingly and removably engage said socket, and during the engagement of said plug to said socket said compartment being supported by said clamp means and removably secured thereto.

3. A portable cabinet having side, front and rear walls, a radio receiver means fixedly enclosed within said walls, an earphone socket mounted in one of said side walls, an openable compartment having a hinged cover located at the top portion of said compartment, winding means within said compartment, a flexible conductor means wound around the axis of said winding means, an earphone fixedly attached to one end of said conductor means, said earphone adapted for its removal from said compartment when said cover is raised to an open position, an earphone plug attached to the other end of said flexible conductor means, clamp means having one end fixedly connected with said compartment, the inside portion of said clamp means including a plurality of brackets adapted to centrally position and secure said conductor means within said clamp means, the other end of said clamp means being connected with said plug, which plug being adapted to matingly and removably engage said socket, and during engagement of said plug to said socket said compartment being supported by said clamp means and removably secured thereto.

4. A portable cabinet having side, front and rear walls, a radio receiver adapted to be operated alternatively from a self-containing unidirectional power source or from an external alternating current source, said receiver being fixedly secured within said walls, said receiver including an amplifier, an earphone socket mounted in one of said side walls, a flexible conductor means coupled to said earphone socket, said conductor means extending into said amplifier, and openable compartment having a cover located at the top portion of said compartment, winding means within said compartment, a flexible conductor means wound around the axis of said winding means, an earphone fixedly attached to one end of said conductor means, said earphone adapted to be removed from said compartment when said cover is raised to an open position, an earphone plug attached to the other end of said flexible conductor means, clamp means having one of its ends fixedly connected with said compartment, the inside portion of said clamp means including a plurality of spacingly from each other positioned brackets, said brackets being secured to said inside portion by means of set screws, said brackets adapted to centrally position and secure within the clamp means the portion of said conductor means located outside of said compartment, the other end of clamp means being fixedly connected with said plug, which plug being adapted to matingly and removably engage said socket, during the period of engagement of said plug to said socket, said compartment being supported at the lower end corner of said rear wall by said clamp means and thus the compartment being secured to said cabinet by said clamp means.

5. A portable cabinet as in claim 4, wherein said winding means includes a spring biased take-up reel capable of holding said flexible conductor means coiled on said reel, but permitting said conductor means to be uncoiled from the reel to any desired length.

6. A portable cabinet as in claim 4, wherein said flexible conductor means is an electrical power cord, said earphone and earphone plug being connected to said cord.

7. A portable cabinet as in claim 4, wherein clamp means is a spring steel clamp of an elongated and semicircular configuration.

8. A portable cabinet having side, front and rear walls, a radio receiver adapted to be operated alternatively from a self-containing unidirectional power source or from an external alternating current source, said receiver being fixedly secured within said walls, said receiver including an amplifier, an earphone socket mounted in one of said side walls, a flexible conductor means coupled to said earphone socket, said conductor means extending into said amplifier, an openable compartment having a cover located at the top portion of said compartment, winding means within said compartment, a flexible conductor means wound around the axis of said winding means, an earphone fixedly attached to one end of said conductor means, said earphone adapted to be removed from said compartment when said cover is opened, an earphone plug attached to the other end of said flexible conductor means, clamp means having one of its ends fixedly connected with said compartment, the inside portion of said clamp means including a portion of conductor means extending from a side of said compartment, said portion of conductor means being secured to said inside portion of said clamp means in a sealing relationship, the other end of clamp means being fixedly connected with said plug, which plug being adapted to matingly and removably engage said socket, during the period of engagement of said plug with said socket, said compartment being supported and removably secured to the lower end corner of said rear wall of said cabinet by said clamp means.

9. A portable cabinet having side, front and rear walls, made out of metallic substance, a radio receiver adapted to be operated alternatively from a self-containing unidirectional power source or from an external alternating current source, said receiver being fixedly secured within said walls, said receiver including an amplifier, an earphone socket mounted in one of said side walls, a flexible conductor means coupled to said earphone socket, said conductor means extending into said amplifier, an openable compartment having a cover located at the top portion of said compartment, winding means within said compartment, a flexible conductor means wound around the axis of said winding means, an earphone fixedly attached to one end of said conductor means, said earphone adapted to be removed from said compartment when said cover is raised to an open postion, an earphone plug attached to the other end of said flexible conductor means, one side of said compartment being fixedly fastened to a thin strip of magnetic metal, the compartment being removably secured to said rear wall by means of said strip of magnetic metal.

10. A portable cabinet having side, rear and front walls, a radio receiver adapted to be operated alternatively from a self containing unidirectional power source or from an external alternating current source, said receiver being fixedly secured within said walls, said receiver including an amplifier, an earphone socket mounted in one of side walls, a flexible conductor means coupled to said earphone socket, said conductor means extending into said amplifier, a flexible power conductor means, an end of said power conductor means connected with the chassis of said receiver, a U-shaped clip means having two openable compartments located on the sides of said clip means, winding means within each of said compartments, an openable cover located on the top of each of said compartments, a flexible conductor means wound on the axis of one of the winding means within one of said compartments, said flexible power conductor means wound on the axis of the winding means of the other of said compartments, an earphone fixedly attached to one end of said conductor means, an electrical element attached to the free end of said flexible power conductor means, said earphone adapted to be removed from said one compartment when said cover is opened, said electrical element adapted to be removed from said other compartment when said cover is opened, clamp means having one of its ends fixedly connected with said one compartment, the inside portion of said clamp means including a portion of conductor means extending from a side of said one compartment, said portion of conductor means being secured to said inside portion of said clamp means in a sealing relationship, the other end of clamp means being fixedly connected with said earphone plug, said earphone plug being adapted to matingly and removably engage said socket, during the period of engagement of said plug with said socket, said clip means and the associated compartments being removably secured to both front and rear walls of said cabinet.

11. A portable cabinet having side, rear and front walls made of metallic substance, a radio receiver being adapted to be operated alternatively from a self containing unidirectional power source or from an external alternating current source, said receiver being fixedly secured within said walls, an earphone socket mounted in one of said side walls, and adapted to receive an earphone plug, a flexible conductor means coupled to said earphone socket, a flexible power conductor means, an end of which is connected with said receiver, clip means made of magnetic substance, said clip means including two openable compartments each of which contain winding means, flexible conductor means wound on the axis of one of said winding means within one of said compartments, said flexible power conductor means wound on the axis of the winding means of the other of said compartments, an earphone fixedly connected to one end of said conductor means of said first compartment, an electric plug attached to the free end of said flexible power conductor means, said earphone adapted to be removed from said first compartment when said cover is opened, said electric plug adapted to be removed from said second compartment when said cover is opened, a portion of conductor means extending from a side of said first compartment, the other end of said conductor means connected to said earphone socket by means of said earphone plug which plug being adapted to matingly and removably engage said socket.

No references cited.

KATHLEEN H. CLAFFY, *Primary Examiner.*

R. S. BELL, *Assistant Examiner.*

U.S. Cl. X.R.

179—178